(12) United States Patent
Oh

(10) Patent No.: US 9,877,179 B2
(45) Date of Patent: Jan. 23, 2018

(54) METHOD FOR OPERATING AUDIO, VIDEO, AND NAVIGATION (AVN) SYSTEM, AVN SYSTEM, AND VEHICLE INCLUDING THE SAME

(71) Applicant: HYUNDAI MOTOR COMPANY, Seoul (KR)

(72) Inventor: Hyung Suk Oh, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 8 days.

(21) Appl. No.: 14/957,565

(22) Filed: Dec. 2, 2015

(65) Prior Publication Data

US 2017/0099594 A1    Apr. 6, 2017

(30) Foreign Application Priority Data

Oct. 6, 2015   (KR) .................. 10-2015-0140259

(51) Int. Cl.

| H04M 11/04 | (2006.01) |
|---|---|
| H04W 4/22 | (2009.01) |
| G07C 5/08 | (2006.01) |
| H04M 3/51 | (2006.01) |
| G08B 25/01 | (2006.01) |
| G08G 1/00 | (2006.01) |

(52) U.S. Cl.
CPC ............ *H04W 4/22* (2013.01); *G07C 5/0816* (2013.01); *G08B 25/016* (2013.01); *G08G 1/205* (2013.01); *H04M 3/5116* (2013.01); *H04M 2242/04* (2013.01)

(58) Field of Classification Search
CPC . G08B 25/016; H04M 11/04; H04M 2242/04; H04M 3/5116; H04W 4/22; H04W 76/007; G07C 5/0816

USPC .................................................. 455/404.1
See application file for complete search history.

(56) References Cited

U.S. PATENT DOCUMENTS 6,114,839 A *  9/2000  Takano .............. H01M 10/4257
                                                        320/150
6,661,116 B1 *  12/2003  Seto ...................... H02J 7/0063
                                                        307/10.1

(Continued)

FOREIGN PATENT DOCUMENTS

| JP | 2002-135460 A | 5/2002 |
|---|---|---|
| JP | 2011-232872 A | 11/2011 |

(Continued)

OTHER PUBLICATIONS

Extended European Search Report dated Dec. 14, 2016 issued in European Patent Application No. 15200082.4.

(Continued)

*Primary Examiner* — Kathy Wang-Hurst
*Assistant Examiner* — B. M. M Hannan
(74) *Attorney, Agent, or Firm* — McDermott Will & Emery LLP

(57) ABSTRACT

An audio, video, and navigation (AVN) system includes a battery voltage detection circuit configured to detect an output voltage of a main battery; an e-call power controller configured to output power of a back-up battery (BUB) based on a result of detecting the output voltage; and a central controller configured to receive the power of the BUB and to generate an accident occurrence message when an airbag inflation signal is received.

18 Claims, 6 Drawing Sheets

(56) References Cited

U.S. PATENT DOCUMENTS

| | | | |
|---|---|---|---|
| 7,616,978 B2 | 11/2009 | Piekarz | |
| 2001/0002121 A1* | 5/2001 | Seto | H02J 7/1423 340/661 |
| 2004/0075345 A1 | 4/2004 | Yoshioka et al. | |
| 2008/0122592 A1* | 5/2008 | Shimizu | G08G 1/205 340/425.5 |
| 2008/0122614 A1* | 5/2008 | Sakai | G08B 29/181 340/539.18 |
| 2008/0204262 A1* | 8/2008 | Shimizu | G08B 29/181 340/636.1 |
| 2008/0266078 A1 | 10/2008 | Koie | |
| 2010/0137006 A1* | 6/2010 | Rofougaran | H04M 1/6075 455/457 |
| 2012/0149323 A1* | 6/2012 | Springs | B60R 25/403 455/404.1 |
| 2013/0106594 A1 | 5/2013 | Hiramatsu et al. | |
| 2013/0331055 A1 | 12/2013 | McKown et al. | |
| 2014/0142812 A1* | 5/2014 | Arai | G07C 5/085 701/45 |
| 2014/0294180 A1* | 10/2014 | Link, II | G08G 1/205 380/270 |
| 2015/0044982 A1* | 2/2015 | Vogler | H04W 4/22 455/404.1 |

FOREIGN PATENT DOCUMENTS

| | | |
|---|---|---|
| KP | 10-1422260 B1 | 7/2014 |
| KR | 10-2010-0055253 A | 5/2010 |
| KR | 10-2011-0105196 A | 9/2011 |
| KR | 10-1228495 B1 | 2/2013 |

OTHER PUBLICATIONS

Korean Office Action dated Jan. 31, 2017 issued in Korean Patent Application No. 10-2015-0140259.

* cited by examiner

| Charge condition | Charge stop condition |
|---|---|
| - Self diagnosis is completed in ACC mode and IGN mode is ON, AND<br>- 0°C ≤ Ambient temperature T ≤ 45°C, AND<br>- BUB voltage ≤ 3.9V, AND<br>- No BUB error is present | - ACC mode and IGN mode are OFF, OR<br>- 0°C > Ambient temperature T > 45°C, OR<br>- BUB voltage ≥ 4.1V, OR<br>- BUB error is present |

FIG. 7

| Component | Voltage (V) | Current (mA) | | Power (mW) | |
|---|---|---|---|---|---|
| | | Normal | Max | Normal | Max |
| Integrated MICOM | 3.3V | 64mA | 200mA | 211mW | 660mW |
| Integrated modem | 3.8V | 250mA (strong electric field) | 550mA (weak electric field) | 950mW | 2,090mW |
| E-call exclusive amplifier (3.8V) | | 600mA | 600mA | 2,280mW | 2,280mW |
| Subtotal | | 914mA | 1,350mA | 3,441mW | 5,030mW |
| Total | | other peripheral elements (CAN, power controller, etc.): Max 300mW | | 3,741mW | 5,330mW |
| Estimated usable time (assuming 5V / 600mAh (3,000mW) BUB) | | | | 0.8 hours (3000mW/ 3,741mW) | 0.5 hours (3,000mW/ 5,330mW) |

METHOD FOR OPERATING AUDIO, VIDEO, AND NAVIGATION (AVN) SYSTEM, AVN SYSTEM, AND VEHICLE INCLUDING THE SAME

CROSS-REFERENCE TO RELATED APPLICATION

This application claims the benefit of priority to Korean Patent Application No. 10-2015-0140259, filed on Oct. 6, 2015, which is hereby incorporated by reference as if fully set forth herein.

TECHNICAL FIELD

The present disclosure relates to a method for operating an audio, video, and navigation (AVN) system, an AVN system, and a vehicle including the same, capable of performing an e-call function.

BACKGROUND

An audio, video, and navigation (AVN) system is a vehicle multimedia system in which an audio system, a video system, and a navigation system are integrated into a single unit. The AVN system provides user convenience in manipulating a variety of multimedia devices included in a vehicle and allows efficient use in the vehicle.

Currently released vehicles include a variety of convenience systems for safe driving. These convenience systems give a warning to a driver using sound or an image when a dangerous situation is predicted, and automatically react to a dangerous situation when the dangerous situation occurs, thereby achieving safe driving.

A service for automatically sending information such as a current location, a gyro sensor value, and airbag inflation information of a vehicle having an accident to following vehicles, a service center, or an emergency or rescue center is called an e-call service. If the e-call service is implemented in many vehicles and an infrastructure related thereto is constructed, a speed of reacting to an emergency situation of an accident may be greatly increased and traffic fatalities may be reduced.

As such, many countries actively attempt to make the e-call service mandatory. If the e-call service becomes mandatory, every vehicle should be equipped with a module for performing the e-call service. However, since mandatory equipment of such module can lead to an increase in vehicle prices, a solution thereto is required.

SUMMARY

The present disclosure is directed to an audio, video, and navigation (AVN) system, an AVN system, and a vehicle including the same which substantially obviate one or more problems due to limitations and disadvantages of the related art.

An object of the present inventive concept is to provide a method for operating an AVN system capable of economically and efficiently performing an e-call function in preparation for mandatory implementation of the e-call service, an AVN system, and a vehicle including the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with an embodiment in the present disclosure, an audio, video, and navigation (AVN) system includes: a battery voltage detection circuit configured to detect an output voltage of a main battery; an e-call power controller configured to output power of a back-up battery (BUB) based on a result of detecting the output voltage; and a central controller configured to receive the power of the BUB and to generate an accident occurrence message when an airbag inflation signal is received.

In accordance with another embodiment in the present disclosure, a vehicle comprises, the audio, video, and navigation (AVN) system which includes: a battery voltage detection circuit for detecting an output voltage of a main battery; an e-call power controller configured to output power of a back-up battery (BUB) based on a result of detecting the output voltage; and a central controller configured to receive the power of the BUB and to generate an accident occurrence message when an airbag inflation signal is received.

In accordance with another embodiment in the present disclosure, a method for operating an audio, video, and navigation (AVN) system may include detecting an output voltage of a main battery, supplying power of a back-up battery (BUB) to a central controller based on a result of detecting the output voltage, and generating an accident occurrence message by the central controller having received the power of the BUB if the central controller receives an airbag inflation signal.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 7 is a table for describing an estimated usable time in e-call mode operation of the AVN system illustrated in FIG. 1.

DETAILED DESCRIPTION

Reference will now be made in detail to exemplary embodiments, examples of which are illustrated in the accompanying drawings. In the following description, a suffix such as "module" and "unit" may be used to refer to elements or components. Use of such a suffix herein is merely intended to facilitate description of the specification, and the suffix itself is not intended to have any special meaning or function.

Figure 1:
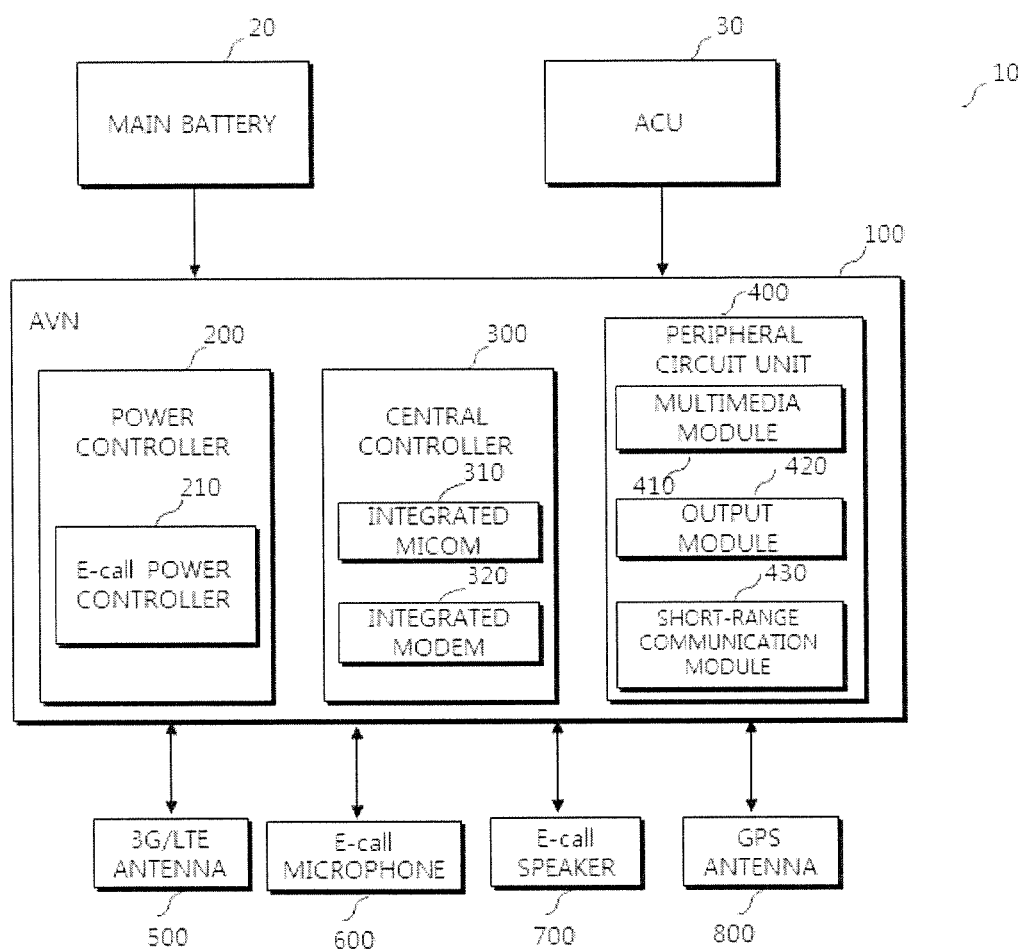
FIG. 1 is a block diagram of a vehicle according to an embodiment in the present disclosure.

FIG. 1 is a block diagram of a vehicle 10 according to an embodiment in the present disclosure.

Referring to FIG. 1, the vehicle 10 may include a main battery 20, an airbag control unit (ACU) 30, an audio, video, and navigation (AVN) system 100, a 3G/LTE antenna 500 (where "/" refers to "and/or"), an e-call microphone 600, an e-call speaker 700, and a global positioning system (GPS) antenna 800.

The main battery 20 may supply operation power through at least one power output terminal to electronic devices included in the vehicle 10. For example, a B+ terminal of the main battery 20 may be connected to the AVN system 100, and the main battery 20 may supply operation power of 12V through the B+ terminal.

The ACU 30 may control airbags installed in the vehicle 10, and generate an airbag inflation signal when the airbags inflate. If an impact detection sensor installed at a specific location of the vehicle 10 detects an impact above a threshold value, the ACU 30 may control the airbags to operate for safety of a driver and passengers. If the airbags operate, the ACU 30 may generate and transmit the airbag inflation signal to the AVN system 100. The airbag inflation signal may be transmitted using a controller area network (CAN) within the vehicle 10. Here, an exchanger, e.g., a CAN gateway (CGW) or a cluster, for matching speed between different-speed communication lines, e.g., body CAN and chassis CAN lines, may be provided between the ACU 30 and the AVN system 100.

The AVN system 100 is a vehicle multimedia system in which an audio system, a video system, and a navigation system are integrated into a single unit. In addition, the AVN system 100 may operate as a system for an e-call service which is a service for automatically sending information such as a current location, a gyro sensor value, and airbag inflation information of a vehicle having an accident to following vehicles, a service center, or an emergency or rescue center.

The AVN system 100 may include a power controller 200, a central controller 300, and a peripheral circuit unit 400.

The power controller 200 may supply power from the main battery 20 into the AVN system 100. The power controller 200 may supply power into the AVN system 100 in a normal mode or in an e-call mode.

The normal mode refers to a state in which no error occurs in power supply of the main battery 20 and, more particularly, to a state in which power is normally suppliable from the main battery 20 to the AVN system 100 without disrupting operation of the AVN system 100 even when a temporary voltage drop occurs.

Figure 2:
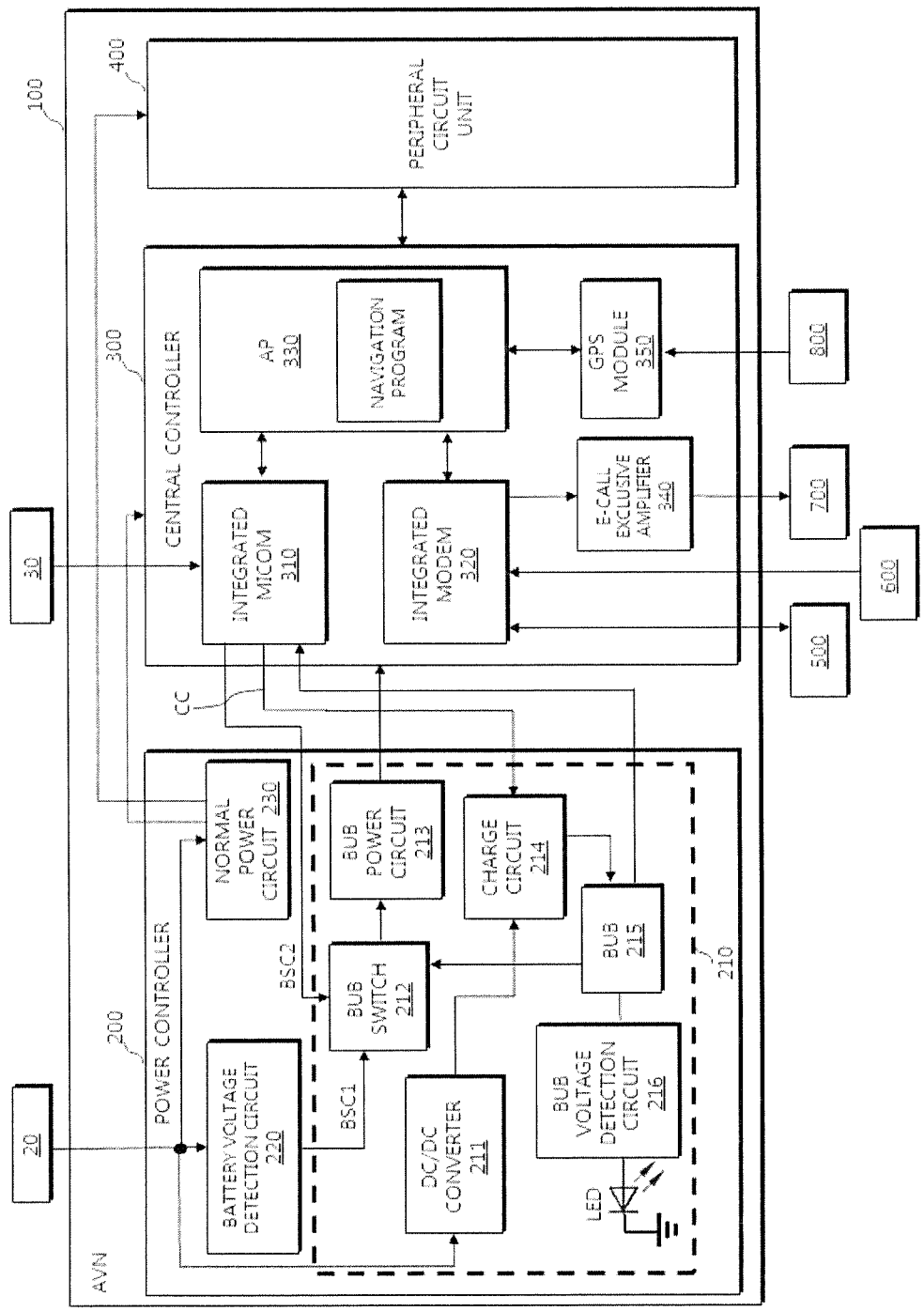
FIG. 2 is a detailed block diagram for describing operation of an audio, video, and navigation (ANV) system illustrated in FIG. 1.

The e-call mode refers to a state in which an error occurs in power supply of the main battery 20, and thus, power is not normally supplied from the main battery 20 to the AVN system 100, and more particularly, to a state in which minimum power for providing the e-call service is supplied using a power source (e.g., a back-up battery (BUB) 215 of FIG. 2) included in the AVN system 100.

An e-call power controller 210 included in the power controller 200 may control power supplied in the e-call mode.

The central controller 300 may provide overall control to the AVN system 100 and communicate with the elements outside the AVN system 100.

The central controller 300 may include an integrated microcomputer (MICOM) 310 and an integrated modem 320. The integrated MICOM 310 and the integrated modem 320 may communicate with the elements included in the vehicle 10 or external devices for operations of the audio system, the video system, and the navigation system, and at the same time, may control the e-call power controller 210 for the e-call service or exchange data for the e-call service with the modules 500, 600, 700, and 800.

The peripheral circuit unit 400 may include a multimedia module 410, an output module 420, and a short-range communication module 430 to provide a service using the audio system, the video system, and the navigation system to a user.

The multimedia module 410 may include a digital multimedia broadcasting (DMB) module for receiving DMB signals to allow the user to watch DMB, a video decoder for decoding an image (e.g., an image received from a rear camera), a radio broadcasting module for receiving AM or FM radio broadcast signals to allow the user to listen to radio broadcasting, a digital signal processor (DSP) for processing digital signals such as DMB signals and broadcast signals, etc.

The output module 420 may include a liquid crystal display (LCD) for outputting images to the user, a built-in amplifier for outputting sound to the user, etc.

The short-range communication module 430 may transmit and receive data to and from a device connected using a short-range communication scheme such as Bluetooth, Wi-Fi, or near field communication (NFC).

Among the elements of the AVN system 100, the modules 410, 420, and 430 included in the peripheral circuit unit 400 are irrespective of the e-call service. The peripheral circuit unit 400 may include other elements which do not need to receive power supplied from the power controller 200 in the e-call mode.

The 3G/LTE antenna 500 is a device for relaying data transmission and reception between a $3^{rd}$ generation (3G) or long term evolution (LTE) mobile communication network and the AVN system 100.

The e-call microphone 600 and the e-call speaker 700 may be used to make an emergency voice call to an emergency rescue center. The e-call microphone 600 and the e-call speaker 700 may be implemented as an exclusive microphone and an exclusive speaker operable with low power. However, the scope of the present disclosure is not limited thereto and the e-call microphone 600 and the e-call speaker 700 may be integrated with a microphone and a speaker for typical multimedia functions (e.g., music, radio, DMB, and navigation functions) of the AVN system 100.

The GPS antenna 800 may receive a navigation message from a GPS satellite and transmit the same to the AVN system 100. Herein, the GPS antenna 800 and the 3G/LTE antenna 500 may be implemented as an integrated module (e.g., a shark antenna) but the scope of the present disclosure is not limited thereto.

FIG. 2 is a detailed block diagram for describing operation of the AVN system 100 illustrated in FIG. 1.

Referring to FIG. 2, a detailed configuration of the AVN system 100 is illustrated. The power controller 200 may include a battery voltage detection circuit 220 and a normal power circuit 230 in addition to the e-call power controller 210.

A description is now given of the battery voltage detection circuit 220 and the normal power circuit 230. The battery voltage detection circuit 220 may detect a voltage of a power output terminal connected to the main battery 20. The battery voltage detection circuit 220 may generate a first BUB switch control signal BSC1 based on the detected voltage of the power output terminal to control a BUB switch 212.

That is, the battery voltage detection circuit 220 may detect the output voltage of the power output terminal, generate the first BUB switch control signal BSC1 to have a first level (e.g., a high level) if the detected output voltage is out of a normal output voltage range (e.g., 10 to 14V), and generate the first BUB switch control signal BSC1 to have a second level (e.g., a low level) if the detected output voltage is within the normal output voltage range. The normal output voltage range includes an upper limit voltage and a lower limit voltage, and may be a preset voltage range used to determine whether the main battery 20 is malfunctioning.

The normal power circuit 230 may provide power of the main battery 20 to the central controller 300 and the peripheral circuit unit 400 in the normal mode. Since the elements included in the central controller 300 and the peripheral circuit unit 400 may have different rated voltages or rated currents, if necessary, the normal power circuit 230 may independently convert and supply the power based on the rated voltage or the rated current of each element. The normal power circuit 230 may include at least one low dropout voltage (LDO) regulator capable of adjusting a voltage and a current to be supplied to an element.

In addition, a diode may be connected to a power transmission line connecting the normal power circuit 230 to the central controller 300 or the peripheral circuit unit 400, thereby improving efficiency of power transmission.

The e-call power controller 210 may include a DC/DC converter 211, a BUB switch 212, a BUB power circuit 213, a charge circuit 214, a BUB 215, and a BUB voltage detection circuit 216.

The DC/DC converter 211 may convert a DC voltage input from the main battery 20, into a specific DC voltage and transmit the converted specific DC voltage to the charge circuit 214. The specific DC voltage may be determined depending on a charge rated voltage of the BUB 215. For example, the DC/DC converter 211 may receive a voltage of 12V from the main battery 20, convert the same into a voltage of 5V, and then supply the converted voltage of 5V to the charge circuit 214.

The BUB switch 212 may transmit power output from the BUB 215 to the BUB power circuit 213 or block the power based on the first BUB switch control signal BSC1 and a second BUB switch control signal BSC2.

For example, while the first BUB switch control signal BSC1 is at the second level, the BUB switch 212 blocks the power output from the BUB 215. Then, if the first BUB switch control signal BSC1 is transited to the first level, the BUB switch 212 transmits the power output from the BUB 215 to the BUB power circuit 213.

Thereafter, the BUB switch 212 may continuously transmit the power to the BUB power circuit 213 or block the power based on the second BUB switch control signal BSC2 generated by the integrated MICOM 310 of the central controller 300.

The BUB power circuit 213 may provide the power of the BUB 215 to the central controller 300 in the e-call mode. Since the elements included in the central controller 300 may have different rated voltages or rated currents, if necessary, the BUB power circuit 213 may independently convert and supply the power based on the rated voltage or the rated current of each element. The BUB power circuit 213 may include at least one LDO regulator capable of adjusting a voltage and a current to be supplied to an element.

For example, a voltage supplied to the integrated MICOM 310 may be 3.3 V, and a voltage supplied to the integrated modem 320 may be 3.8 V.

In addition, a diode may be connected to a power transmission line connecting the BUB power circuit 213 to the central controller 300, thereby improving the efficiency of power transmission.

The charge circuit 214 may transmit power converted by the DC/DC converter 211, to the BUB 215 based on a charge control signal CC transmitted from the integrated MICOM 310. For example, the charge circuit 214 may transmit the power if the charge control signal CC is at a first level (e.g., a high level) and may not transmit the power if the charge control signal CC is at a second level (e.g., a low level).

The BUB 215 may perform charge operation by accumulating the power transmitted from the charge circuit 214, and provide the accumulated power to the BUB switch 212.

The BUB voltage detection circuit 216 may detect a charge voltage of the BUB 215 and output a current corresponding to the charge voltage. For example, the BUB voltage detection circuit 216 may output a small, medium, or large current depending on whether the charge voltage of the BUB 215 corresponds to a low, medium, or high period, and at least one light-emitting diode (LED) connected to a ground terminal may emit green, red, or black (i.e., turned off) light based on the output current. As such, a user may visually check the charge state of the BUB 215.

The central controller 300 may include the integrated MICOM 310, the integrated modem 320, an application processor (AP) 330, an e-call exclusive amplifier 340, and a GPS module 350.

The integrated MICOM 310 may communicate with external electronic devices of the AVN system 100 (e.g., the ACU 30) using a CAN network, receive necessary information from the external electronic devices, or output signals for controlling the external electronic devices.

The integrated MICOM 310 may generate the charge control signal CC for controlling the charge circuit 214 based on vehicle power information received from a start control unit (not shown), temperature information received from a temperature sensor (not shown), voltage information of the BUB 215, and BUB error information.

The vehicle power information is information about whether a current power mode is a B+ mode, an accessory (ACC) mode, an ignition (IGN) mode, or a start mode.

Herein, the B+ mode refers to a state in which power is always supplied irrespective of the position of an ignition key as long as +/− cables are connected to a battery. For example, since an external impact sensor or the like should always operate irrespective of the position of an ignition key even in a parked state, power may be supplied in the B+ mode. The ACC mode refers to a state in which power is supplied only to accessory electronic devices such as a stereo, a clock, and a cigar lighter, and self-diagnosis is performed to determine whether the other electronic devices are operable. The IGN mode refers to a state in which power is supplied to the accessory electronic devices, electronic devices for driving an engine and a transmission, and the AVN system 100. The start mode is a mode for starting ignition and refers to a state in which electricity necessary for starting is sufficiently supplied by blocking power from being provided to some electronic devices consuming much current, e.g., the accessory electronic devices, lights, heating wires, power windows, and wipers.

The temperature information may be information acquired by detecting the temperature of the BUB 215.

The BUB error information may be information about an error (e.g., a connection error of each line or an operational error) within the e-call power controller 210.

That is, the integrated MICOM 310 may determine whether the above information satisfies a certain charge condition or a certain charge stop condition, and generate the charge control signal CC based on the determination result.

In addition, the integrated MICOM 310 may receive the airbag inflation signal from the ACU 30 and generate the second BUB switch control signal BSC2 based on the airbag inflation signal. When the airbag inflation signal is received, the integrated MICOM 310 may transmit an accident occurrence signal to the AP 330.

The integrated MICOM 310 may transmit and receive data, e.g., electronic device control signals, to and from the AP 330. The data transmission and reception may be performed using a universal asynchronous receiver/transmitter (UART) but the scope of the present disclosure is not limited thereto.

The integrated modem 320 may receive an accident occurrence message to be described below, from the AP 330 and transmit the accident occurrence message through the 3G/LTE antenna 500 to a preset emergency rescue center.

The AP 330 may control overall function (e.g., audio and video reproduction, navigation execution, communication with external devices, and user interface (UI) management) of the AVN system 100. For example, the AP 330 may execute a navigation program for performing a navigation function.

In the e-call mode, if the accident occurrence signal is received from the integrated MICOM 310 and thus occurrence of an accident is recognized, the navigation program may collect GPS information in association with the GPS module 350 and generate and transmit the accident occurrence message to the integrated modem 350.

The accident occurrence message may be a short message service (SMS) message including an identification number of the vehicle 10, a phone number of the AVN system 100, GPS information, user personal information (e.g., age, gender, and blood type), and information about whether an accident occurs.

The navigation program may compress and encrypt the accident occurrence message using a specific compression format and a specific encryption algorithm to prevent leakage of the user personal information.

Although the above-described operation in the e-call mode is performed by the navigation program, the scope of the present disclosure is not limited thereto and, according to another embodiment, the operation in the e-call mode may be performed by an e-call exclusive program independent of the navigation program.

For example, the AP 330 may communicate with the integrated modem 320 using a universal serial bus (USB) and communicate with the GPS module 350 using a UART, but the scope of the present disclosure is not limited thereto.

The e-call exclusive amplifier 340 may output sound when an emergency voice call is made to an emergency rescue center using the e-call microphone 600 and the e-call speaker 700. The e-call exclusive amplifier 340 may receive power supplied from the BUB power circuit 213 only in the e-call mode. That is, the normal power circuit 230 may not supply power to the e-call exclusive amplifier 340.

The GPS module 350 may receive a navigation message from the GPS antenna 800, generate GPS information corresponding to a current location of the vehicle 10 based on the navigation message, and transmit the GPS information to the AP 330.

Figure 3:
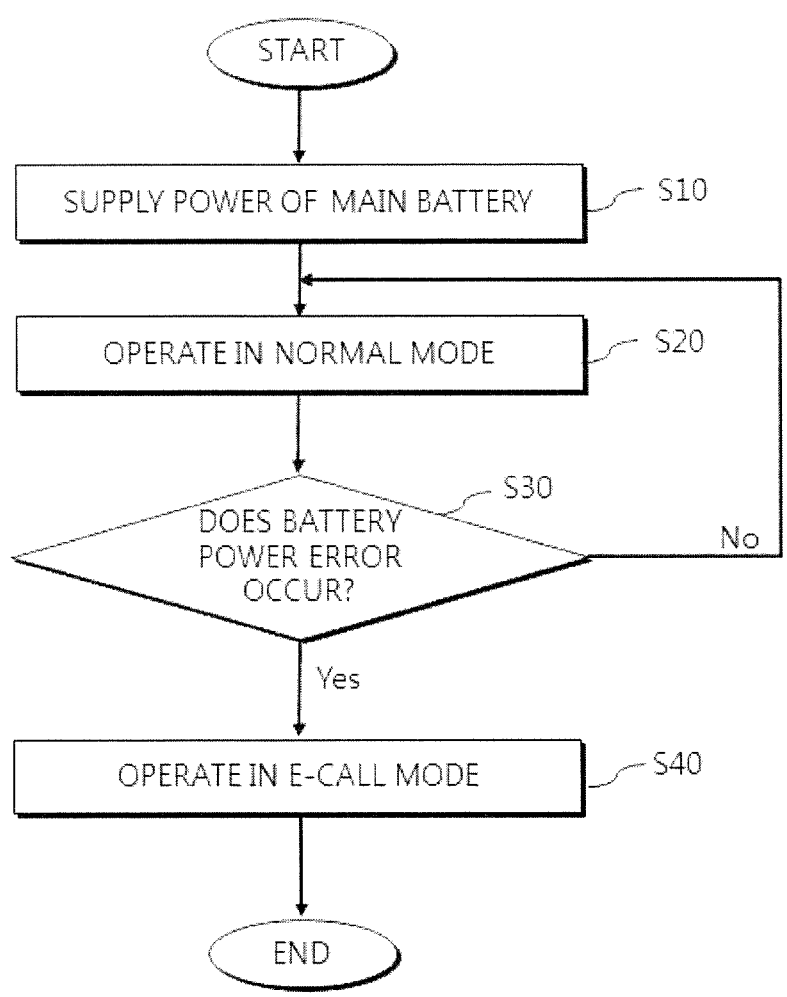
FIG. 3 is a flowchart of a method for operating the AVN system illustrated in FIG. 1.
Figures 4, 5:
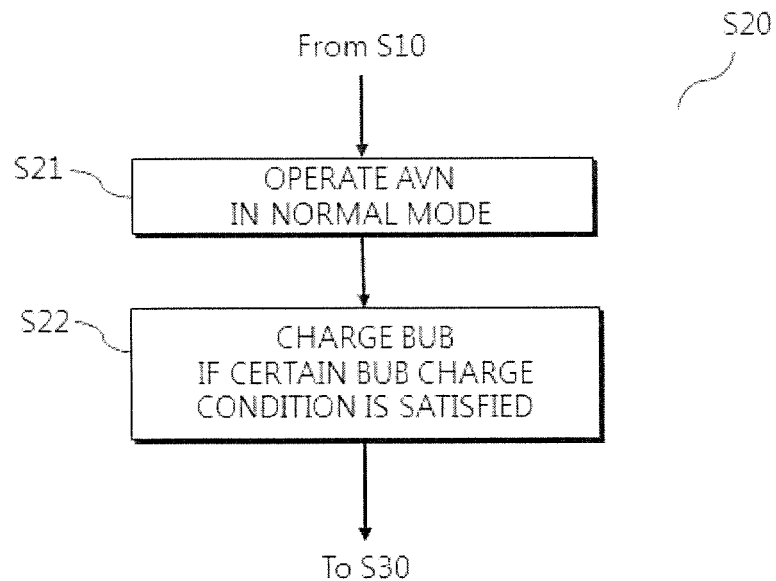
FIG. 4 is a detailed flowchart of step S20 illustrated in FIG. 3.
FIG. 5 is a table for describing step S22 of FIG. 4
Figure 6:
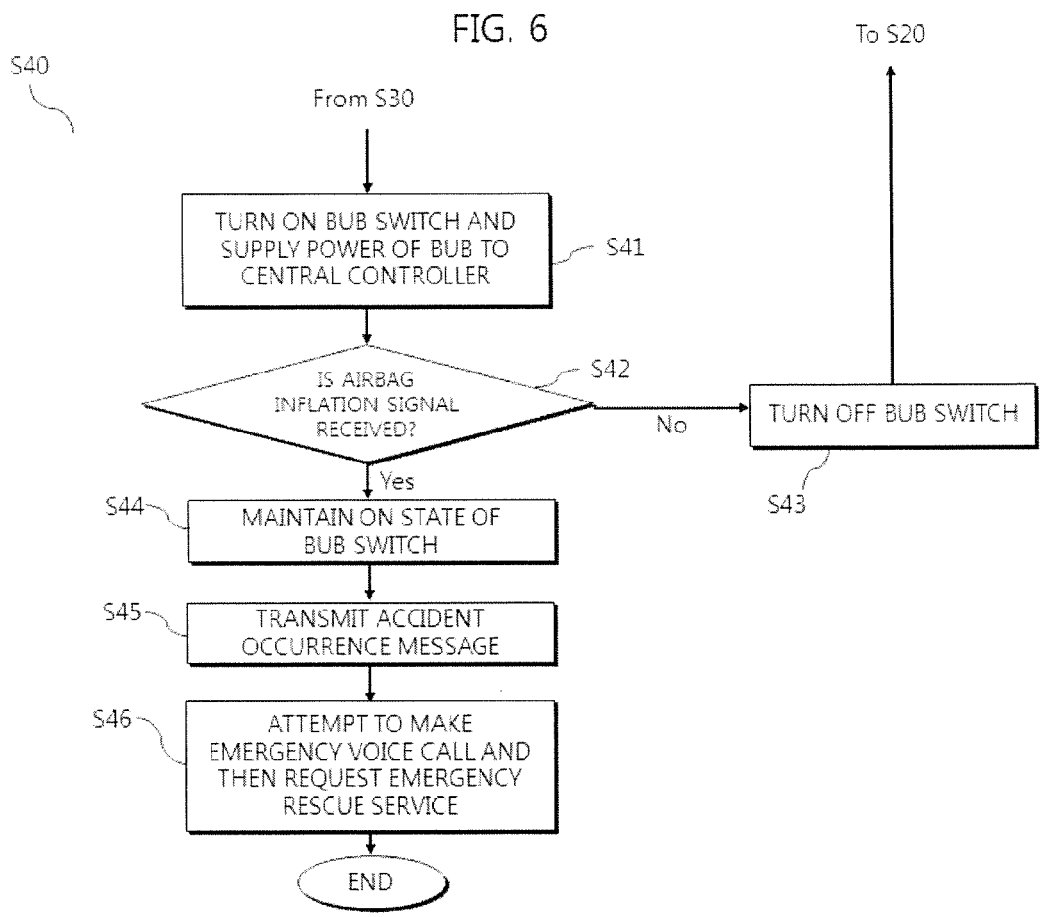
FIG. 6 is a detailed flowchart of step S40 illustrated in FIG. 3.

FIG. 3 is a flowchart of a method for operating the AVN system 100 illustrated in FIG. 1. FIG. 4 is a detailed flowchart of step S20 illustrated in FIG. 3. FIG. 5 is a table for describing step S22 of FIG. 4. FIG. 6 is a detailed flowchart of step S40 illustrated in FIG. 3. FIG. 7 is a table for describing an estimated usable time in e-call mode operation of the AVN system 100 illustrated in FIG. 1.

Referring to FIGS. 1 to 7, if the battery voltage detection circuit 220 detects a voltage of a power output terminal of the main battery 20 and the detected voltage is within a normal output voltage range, the normal power circuit 230 may supply power to the central controller 300 and the peripheral circuit unit 400 (S10).

The central controller 300 and the peripheral circuit unit 400 may provide audio, video, and navigation services upon a request of a user in the normal mode, and at the same time, may charge the BUB 215 if a certain BUB charge condition is satisfied (S20).

FIG. 4 shows detailed operation of the AVN system 100 in step S20.

The central controller 300 and the peripheral circuit unit 400 of the AVN system 100 provide the audio, video, and navigation services upon the request of the user in the normal mode (S21).

The integrated MICOM 310 may charge the BUB 215 if the certain BUB charge condition is satisfied during operation in the normal mode (S22).

The integrated MICOM 310 determines whether the certain BUB charge condition or a certain BUB charge stop condition is satisfied, based on the vehicle power information, the temperature information, the voltage information of the BUB 215, and the BUB error information, which are mentioned above in relation to FIG. 2.

FIG. 5 shows a charge condition and a charge stop condition.

That is, the charge condition is a condition satisfying all of a condition that self-diagnosis is completed in an accessory (ACC) mode and an ignition (IGN) mode is activated (hereinafter referred to as a first condition), which is determined based on the vehicle power information, a condition that an ambient temperature is within a specific temperature range (e.g., equal to or higher than 0° C. and equal to or lower than 45° C.) (hereinafter referred to as a second condition), which is determined based on the temperature information, a condition that a voltage of the BUB 215 is equal to or lower than a specific voltage (e.g., 3.9V) (hereinafter referred to as a third condition), which is determined based on the voltage information of the BUB 215, and a condition that the BUB error information is not present (hereinafter referred to as a fourth condition).

The charge condition is used to control the BUB 215 to be changed when a power mode of the vehicle 10 secures sufficient surplus power to charge the BUB 215, when a current temperature is within a temperature range capable of normally charging the BUB 215, when the voltage of the BUB 215 is sufficiently low to charge the BUB 215, and when no error is present to charge the BUB 215.

If all of the first to fourth conditions are satisfied, the integrated MICOM 310 may generate the charge control signal CC of the first level and the charge circuit 214 may supply a voltage converted from power of the main battery 20 to the BUB 215 to charge the BUB 215.

The charge stop condition is a condition satisfying at least one of a condition that both ACC mode and IGN mode are deactivated (hereinafter referred to as a fifth condition), which is determined based on the vehicle power information, a condition that an ambient temperature is out of a specific temperature range (e.g., lower than 0° C. or higher than 45° C.) (hereinafter referred to as a sixth condition), which is determined based on the temperature information, a condition that a voltage of the BUB 215 is higher than a specific voltage (e.g., 4.1V) (hereinafter referred to as a seventh condition), which is determined based on the voltage information of the BUB 215, and a condition that the BUB error information is present (hereinafter referred to as an eighth condition).

The charge stop condition is used to control the BUB 215 not to be changed when the power mode of the vehicle 10 does not secure sufficient surplus power to charge the BUB 215, when the current temperature is out of the temperature range capable of normally charging the BUB 215, when the voltage of the BUB 215 is not sufficiently low to charge the BUB 215, and when an error occurs in charging the BUB 215.

If one of the fifth to eighth conditions is satisfied, the integrated MICOM 310 may generate the charge control signal CC of the second level, and the charge circuit 214 may block a voltage converted from power of the main battery 20 from being provided to the BUB 215.

If the battery voltage detection circuit 220 detects the voltage of the power output terminal of the main battery 20 and the detected voltage is within the normal output voltage range, i.e., if a battery power error does not occur (e.g., "No" of S30), the normal power circuit 230 may supply power to the central controller 300 and the peripheral circuit unit 400, and the operation of the normal mode may be continued.

If the battery voltage detection circuit 220 detects the voltage of the power output terminal of the main battery 20 and the detected voltage is out of the normal output voltage range (e.g., "Yes" of S30), the AVN system 100 may enter the e-call mode (S40).

FIG. 6 shows detailed operation of the AVN system 100 in step S40.

The battery voltage detection circuit 220 turns on the BUB switch 212 using the first BUB switch control signal BSC1 of the first level, and the BUB switch 212 may allow the BUB power circuit 213 to supply power of the BUB 215 to the central controller 300 (S41).

If the airbag inflation signal is not received from the ACU 30 (e.g., "No" of S42), the integrated MICOM 310 may turn off the BUB switch 212 using the second BUB switch control signal BSC2 of the first level to block the power of the BUB 215 from being supplied to the central controller 300 (S43).

Since the vehicle 10 does not have an accident and a temporary voltage drop merely occurs in the main battery 20, the AVN system 100 may enter the normal mode again.

According to another embodiment, in addition to the airbag inflation signal received from the ACU 30, the integrated MICOM 310 may determine whether the vehicle 10 is turned over, based on a signal received from a gyro sensor (not shown) provided inside or outside the AVN system 100, and thus determine the level of the second BUB switch control signal BSC2.

In addition to the airbag inflation signal received from the ACU 30 or the signal received from the gyro sensor, the integrated MICOM 310 may determine whether the vehicle 10 has an accident, based on one or more signals received from other sensors.

If the airbag inflation signal is received from the ACU 30 (e.g., "Yes" of S42), the integrated MICOM 310 may maintain the on state of the BUB switch 212 using the second BUB switch control signal BSC2 of the second level and thus continuously supply the power of the BUB 215 to the central controller 300 (S44).

The AP 330 may recognize that the airbag inflation signal is generated, based on a signal received from the integrated MICOM 310, and generate the accident occurrence message mentioned above in relation to FIG. 2. The accident occurrence message may be transmitted through the integrated modem 320 and the 3G/LTE antenna 500 to an emergency rescue center (e.g., a telematics center or 911) (S45).

The emergency rescue center having received the accident occurrence message may attempt to make an emergency voice call to the phone number of the AVN system 100. If the voice call is connected, the integrated modem 320 may provide voice communication between the user and the emergency rescue center using the e-call microphone 600 and the e-call speaker 700, and thus, the emergency rescue center may request an emergency rescue service (e.g., to send emergency vehicles) (S46).

FIG. 7 is a table showing estimated usable times in the e-call mode when power capacity of the BUB 215 is 3000 mW (5V/600 mAh), and the BUB 215 is fully charged.

The table shows rated voltages 3.3 V, 3.8 V, and 3.8 V of the integrated MICOM 310, the integrated modem 320, and the e-call exclusive amplifier 340, and shows currents consumed in a normal consumption case Normal and a maximum consumption case Max. Specifically, the integrated modem 320 consumes 250 mA in a strong electric field having good reception quality and consumes 550 mA in a weak electric field having poor reception quality.

In addition to the integrated MICOM 310, the integrated modem 320, and the e-call exclusive amplifier 340, power consumed by other peripheral elements (e.g., a CAN module and a power controller) for the e-call mode operation is assumed to be up to 300 mW.

Accordingly, a total amount of power consumed in the e-call mode may be calculated to be 3741 mW and 5330 mW in the normal consumption case Normal and the maximum consumption case Max, respectively.

Since the power capacity of the BUB 215 is 3000 mW, the estimated usable time of the e-call mode in the normal consumption case Normal is 0.8 hours and the estimated usable time of the e-call mode in the maximum consumption case Max is 0.5 hours.

That is, when the power capacity of the BUB 215 is 3000 mW, a sufficient time required to recognize that an accident occurs, to transmit an accident occurrence message, and to make an emergency voice call, e.g., 0.5 to 0.8 hours, may be secured. In addition, the power capacity of the BUB 215 may be arbitrarily changed depending on the structure, the price, the minimum usable time, etc. of the AVN system 100.

Using a method for operating an AVN system, an AVN system, and a vehicle including the same, according to embodiments, since an e-call function is performed using a MICOM and a modem of the AVN system without additionally installing an e-call exclusive unit having a MICOM and a modem, cost reduction may be maximized.

In addition, when the AVN system operates in an e-call mode, the e-call mode may be performed using only a back-up battery by blocking power from being supplied to unrelated elements.

Furthermore, since only minimum logic capable of performing an e-call function when an error occurs in the back-up battery and a main battery is added to the AVN system, costs may be reduced and the life of a drive may be rapidly and scientifically protected when an emergency occurs.

Although the first level is a high level and the second level is a low level in the above description, the scope of the present disclosure is not limited thereto and the first and second levels may be switched or may be controlled in a variety of other manners.

The above-described method for operating the AVN system can also be embodied as computer-readable code on a computer-readable recording medium. The computer-readable recording medium is any data storage device that can store data which can be thereafter read by a computer system. Examples of the computer-readable recording medium include read-only memory (ROM), random-access memory (RAM), magnetic tapes, magnetic disks, flash memory, and optical data storage devices. The computer-readable recording medium can also be distributed over network coupled computer systems so that the computer-readable code is stored and executed in a distributed fashion.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. An audio, video, and navigation (AVN) system for performing music, radio, DMB, and navigation functions as well as generating an accident occurrence message in a vehicle, comprising:
    a battery voltage detection circuit configured to detect an output voltage of a main battery to generate one of first and second control signals, each having a different voltage level according to the output voltage;
    a normal power circuit configured to output power of the main battery in response to the first control signal;
    an e-call power controller configured to output power of a back-up battery (BUB) in response to the second control signal; and
    a central controller, implemented in a single unit including a MICOM configured to control a CAN network and an application processor configured to perform at least one of the music, the radio, the DMB and the navigation functions, configured to generate the accident occurrence message when an airbag inflation signal is received while the power of the BUB is supplied to the central controller by the e-call power controller,
    wherein the normal power circuit supplies the power of the main battery to the central controller when the output voltage is within a normal output voltage range, while the e-call power controller supplies the power of the BUB to the central controller when the output voltage is below the normal output voltage range, and
    wherein the e-call power controller comprises:
    a BUB switch configured to control whether the power of the BUB is output, according to a first BUB switch control signal corresponding to the output voltage of the main battery generated by the battery voltage detection circuit and a second BUB switch control signal corresponding to a reception of the airbag inflation signal generated by the central controller;
    a BUB power circuit configured to convert the power of the BUB and provide the central controller with the power of the BUB; and
    a BUB voltage detection circuit configured to detect a charge voltage of the BUB and output a current corresponding to the charge voltage of the BUB.

2. The AVN system according to claim 1, wherein the central controller provides an emergency voice call with an emergency rescue center which receives the accident occurrence message.

3. The AVN system according to claim 1, wherein the e-call power controller charges the BUB when a charge condition is satisfied during the supply of the power of the main battery to the central controller and the peripheral circuit unit.

4. The AVN system according to claim 3, wherein the e-call power controller stops the charging of the BUB when a charge stop condition is satisfied during the supply of the power of the main battery to the central controller and the peripheral circuit unit.

5. The AVN system according to claim 4, wherein the charge condition or the charge stop condition is determined based on at least one of vehicle power information, temperature information, voltage information of the BUB, and BUB error information.

6. The AVN system according to claim 1, wherein the e-call power controller supplies the power of the BUB to the central controller when the output voltage is out of a normal output voltage range.

7. The AVN system according to claim 1, wherein the e-call power controller stops the supplying of the power of the BUB to the central controller when the central controller does not receive the airbag inflation signal.

8. The AVN system according to claim 1, wherein the accident occurrence message comprises at least one of a vehicle identification number, a phone number of the AVN system, global positioning system (GPS) information, user personal information, and information about whether an accident occurs.

9. The AVN system according to claim 1, wherein the BUB power circuit is configured to convert the power of the BUB based on rated voltage or rated current of elements included in the central controller.

10. An audio, video, and navigation (AVN) system for performing music, radio, DMB, and navigation functions as well as generating an accident occurrence message in a vehicle, comprising:
    a battery voltage detection circuit for detecting an output voltage of a main battery to generate one of first and second control signals, each having a different voltage level according to the output voltage;
    a normal power circuit configured to output power of the main battery in response to the first control signal;
    an e-call power controller configured to output power of a back-up battery (BUB) in response to the second control signal; and
    a central controller, implemented in a single unit including a MICOM configured to control a CAN network and an application processor configured to perform at least one of the music, the radio, the DMB and the navigation functions, configured to generate the accident occurrence message when occurrence of an accident of the vehicle is detected while the power of the BUB is supplied to the central controller by the e-call power controller,
    wherein the normal power circuit supplies the power of the main battery to the central controller when the output voltage is within a normal output voltage range, while the e-call power controller supplies the power of the BUB to the central controller when the output voltage is below the normal output voltage range, and
    wherein the e-call power controller comprises:

a BUB switch configured to control outputting the power of the BUB based on a first BUB switch control signal corresponding to the output voltage of the main battery generated by the battery voltage detection circuit and a second BUB switch control signal corresponding to reception of the airbag inflation signal generated by the central controller;
a BUB power circuit configured to convert the power of the BUB and provide the central controller with the converted power of the BUB; and
a BUB voltage detection circuit configured to detect a charge voltage of the BUB and output a current corresponding to the charge voltage of the BUB.

11. The AVN system according to claim 10, wherein the central controller provides an emergency voice call with an emergency rescue center which receives the accident occurrence message.

12. The AVN system according to claim 10, wherein the e-call power controller charges the BUB when a charge condition is satisfied during the supply of the power of the main battery to the central controller and the peripheral circuit unit.

13. The AVN system according to claim 12, wherein the e-call power controller stops the charging of the BUB when a charge stop condition is satisfied during the supply of the power of the main battery to the central controller and the peripheral circuit unit.

14. The AVN system according to claim 13, wherein the charge condition is satisfied when:
a first condition that self-diagnosis is completed in an accessory (ACC) mode and an ignition (IGN) mode is activated, which is determined based on vehicle power information;
a second condition that an ambient temperature is within a reference temperature range, which is determined based on temperature information;
a third condition that a voltage of the BUB is equal to or lower than a reference voltage, which is determined based on voltage information of the BUB; and
a fourth condition that BUB error information is not present.

15. The AVN system according to claim 13, wherein the charge stop condition is satisfied when:
a fifth condition that both an ACC mode and an IGN mode are deactivated, which is determined based on vehicle power information;
a sixth condition that an ambient temperature is out of a reference temperature range, which is determined based on temperature information;
a seventh condition that a voltage of the BUB is higher than a specific voltage, which is determined based on voltage information of the BUB; and
an eighth condition that BUB error information is present.

16. The AVN system according to claim 10, wherein the central controller detects the occurrence of the accident of the vehicle based on at least one of information about whether an airbag inflation signal is received, and information received from a gyro sensor.

17. A method for operating an audio, video, and navigation (AVN) system for performing music, radio, DMB, and navigation functions as well as generating an accident occurrence message in a vehicle, the method comprising:
detecting, by a battery voltage detection circuit, an output voltage of a main battery to generate one of first and second control signals, each having a different voltage level according to the output voltage;
supplying, by a normal power controller included in the AVN system, power of the main battery to a central controller, implemented in a single unit including a MICOM configured to control a CAN network and an application processor configured to perform at least one of the music, the radio, the DMB and the navigation functions, in response to the first control signal;
supplying, by an e-call power controller included in the AVN system, power of a back-up battery (BUB) to the central controller included in the AVN system in response to the second control signal; and
generating, by the central controller, the accident occurrence message when the power of BUB is supplied to the central controller in response to the second control signal and the central controller receives an airbag inflation signal,
wherein the e-call power controller comprises:
a BUB switch configured to control outputting the power of the BUB based on a first BUB switch control signal corresponding to the output voltage of the main battery generated by the battery voltage detection circuit and a second BUB switch control signal corresponding to reception of the airbag inflation signal generated by the central controller;
a BUB power circuit configured to convert the power of the BUB and provide the central controller with the converted power of the BUB; and
a BUB voltage detection circuit configured to detect a charge voltage of the BUB and output a current corresponding to the charge voltage of the BUB.

18. The method according to claim 17, wherein the power of the main battery is supplied by the normal power circuit to the central controller when the output voltage is within a normal output voltage range, while the power of the BUB is supplied by the e-call power controller to the central controller when the output voltage is below the normal output voltage range.

* * * * *